(12) United States Patent
Rolser et al.

(10) Patent No.: US 11,746,901 B2
(45) Date of Patent: Sep. 5, 2023

(54) DEVICE FOR OPERATING A PARKING LOCK OF A MOTOR VEHICLE TRANSMISSION

(71) Applicant: ZF Friedrichshafen AG, Friedrichshafen (DE)

(72) Inventors: Tobias Rolser, Ravensburg (DE); Christian Popp, Kressbronn (DE); Thilo Schmidt, Meckenbeuren (DE); Armin Gierling, Langenargen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 17/586,094

(22) Filed: Jan. 27, 2022

(65) Prior Publication Data

US 2022/0235862 A1 Jul. 28, 2022

(30) Foreign Application Priority Data

Jan. 28, 2021 (DE) ...................... 10 2021 200 774.0

(51) Int. Cl.
*F16H 63/34* (2006.01)
*F16H 63/36* (2006.01)

(52) U.S. Cl.
CPC ......... *F16H 63/3483* (2013.01); *F16H 63/36* (2013.01)

(58) Field of Classification Search
CPC ..... F16H 34/36; F16H 34/3483; F16H 34/483
See application file for complete search history.

(56) References Cited

U.S. PATENT DOCUMENTS

| 5,501,434 A | * | 3/1996 | McGuire | ................. F16F 13/24 416/140 |
| 9,897,206 B2 | | 2/2018 | Schuller et al. | |
| 10,788,126 B2 | | 9/2020 | Haugg et al. | |
| 2016/0326990 A1 | * | 11/2016 | Pursifull | ............. F02D 41/0002 |

(Continued)

FOREIGN PATENT DOCUMENTS

| CN | 114370463 A | * | 4/2022 |
| DE | 4127991 A1 | | 2/1993 |

(Continued)

OTHER PUBLICATIONS

German Search Report DE 10 2021 200 774.0, dated Aug. 31, 2021. (10 pages).

*Primary Examiner* — Lori Wu

(74) *Attorney, Agent, or Firm* — Dority & Manning, P.A.

(57) ABSTRACT

A device for operating a parking lock (34) of a transmission (3) includes an engagement spring (345) for engaging the parking lock (34), a hydraulic actuator (340) for disengaging the parking lock (34), an electrohydraulic control unit (35) for hydraulically actuating the actuator (340), and an electronic control unit (36) for electrically actuating the actuator (340) and the electrohydraulic control unit (35). The actuator (340) includes a hydraulic piston (341) operatively connected to the parking lock (34), is actuatable by system pressure (P_sys) of the electrohydraulic control unit (35) via a pressure line (347) upon disengagement of the parking lock (34), and is mechanically interlockable by an interlocking device (342). A choke unit (353) includes an orifice (353) and a non-return valve (354) and is installed in the pressure line (347) downstream from the hydraulic piston (341).

17 Claims, 9 Drawing Sheets

(56) References Cited

U.S. PATENT DOCUMENTS

| | | | |
|---|---|---|---|
| 2017/0268672 A1* | 9/2017 | Mukai | F16H 63/483 |
| 2017/0268673 A1* | 9/2017 | Ishikawa | B60T 13/20 |
| 2018/0281800 A1* | 10/2018 | Tachibanada | F16H 63/3483 |
| 2018/0283419 A1* | 10/2018 | Tachibanada | F16D 41/125 |

FOREIGN PATENT DOCUMENTS

| | | |
|---|---|---|
| DE | 102012013373 A1 | 1/2014 |
| DE | 102017211025 A1 | 1/2019 |

* cited by examiner

DEVICE FOR OPERATING A PARKING LOCK OF A MOTOR VEHICLE TRANSMISSION

CROSS-REFERENCE TO RELATED APPLICATION

The present application is related and has right of priority to German Patent Application No. 102021200774.0 filed in the German Patent Office on Jan. 28, 2021, which is incorporated by reference in its entirety for all purposes.

FIELD OF THE INVENTION

The invention relates to a device for operating a parking lock of a transmission in a motor vehicle.

BACKGROUND

Automatic transmissions for motor vehicles usually include a parking lock, in the interlocked position of which a locking pawl engages into a toothing of a parking interlock gear connected to the output of the automatic transmission and, thereby, acting on an axle of the motor vehicle. In modern automatic transmissions, electrohydraulic systems, which are also referred to as "electronic shifting" or "shift-by-wire systems", have prevailed as the operative connection between the parking lock and an operating unit in the interior space of the motor vehicle. An electrical operative connection between the operating unit of the automatic transmission in the interior space of the vehicle and the electrohydraulic transmission control unit requires a conversion of the electrical signal for actuating the parking lock into a mechanical movement of the locking pawl. A hydraulically actuatable actuator can be provided for this purpose, the hydraulic supply of which is an integral part of a transmission hydraulic system. Here, pressure is usually applied at a piston of the actuator, which is axially displaceably arranged in a cylinder cavity and is operatively connected to the locking pawl, in order to bring the parking lock out of the interlocked position, counter to the spring force of an engagement spring provided for engaging the parking lock.

This type of hydraulically actuatable actuator for actuating a transmission parking lock is known, for example, from DE 41 27 991 A1. Here, the spring force of the engagement spring of the parking lock acts, in the engagement direction of the parking lock, upon the actuator piston of this actuator. In the disengagement direction of the parking lock, this actuator piston can be acted upon by system pressure of an electrohydraulic transmission control unit. For this purpose, an intake line of an actuator pressure chamber, within which the actuator piston is axially displaceably arranged, is connectable to the pressure side of an oil pump of the transmission by an electrically actuatable solenoid valve. In a first switching position of this solenoid valve, the actuator pressure chamber is vented, and so the spring force of the engagement spring acting upon the actuator piston brings about an engagement of the parking lock. In a second switching position of this solenoid valve, the actuator pressure chamber is pressurized with the system pressure delivered by the oil pump, and so the actuator piston actuates the parking lock counter to the spring force of the engagement spring in the disengagement direction of the parking lock.

In order not to need to constantly maintain the pressure acting upon the actuator piston in the disengaged condition of the parking lock at a level sufficient for holding the parking lock in this condition, the actuator can additionally include an electromagnetically actuatable locking device, by which the actuator piston can be mechanically fixed. DE 10 2012 013 373 A1, for example, describes a parking lock actuator including a locking device, which can mechanically interlock the actuator piston in a piston position associated with the engaged condition of the parking lock as well as in a piston position associated with the disengaged condition of the parking lock. Such a locking device is therefore also referred to as "bistable piston interlock". In order to disengage the parking lock and upon disengagement of the parking lock, the mechanical piston interlock must be deactivated—i.e., released—and the actuator piston must be acted upon by clutch pressure, and so the clutch pressure brings the parking lock into the disengaged condition counter to the spring force of the engagement spring. In the disengaged condition of the parking lock, the mechanical piston interlock is reactivated and, in this way, prevents an unintentional movement of the actuator piston.

In the case of the actuator described in DE 10 2012 0133 373 A1, the interlock of the actuator piston takes place via balls, which are radially displaceably mounted in a stationary ball cage and are bringable into a released position or an interlocked position, depending on the switching condition of the electromagnet, by a cone, which is fixedly connected to the armature rod of the electromagnet of the locking device. In the interlocked position, the balls, which have then been displaced radially outward into a corresponding inner contour of the actuator piston, block the actuator piston from moving axially. Alternatively, systems are also known for interlocking the actuator piston that include a pin arranged laterally with respect to the piston rod of the actuator piston, which engages into one of two circumferential grooves of this piston rod, depending on the engagement position of the actuator piston, in order to mechanically fix the actuator piston.

If the actuator piston is mechanically fixed by the locking device in the piston position associated with the disengaged condition of the parking lock and is simultaneously acted upon by the system pressure acting counter to the spring force of the engagement spring, pressure fluctuations—in particular, brief pressure drops and brief pressure peaks—in the system pressure can result in wear at the mechanical piston interlock. If the actuator piston is mechanically fixed by the locking device in the piston position associated with the disengaged condition of the parking lock and, simultaneously, the system pressure previously acting upon the actuator piston is separated, with respect to control, from the pressure chamber of the actuator, and so now only the spring force of the engagement spring acts upon the actuator piston, brief pressure peaks can occur during the reconnection of the system pressure to the pressure chamber of the actuator, which can also result in wear at the mechanical piston interlock.

SUMMARY OF THE INVENTION

On the basis thereof, example aspects of the invention provide an alternative device for operating a transmission parking lock of the generic type, the parking lock actuator of which includes an actuator piston, which is acted upon by a system pressure provided by a pump of the transmission for an electrohydraulic control unit of the transmission in order to disengage the parking lock counter to the spring force of an engagement spring of the parking lock and can be mechanically interlocked in a piston position associated with the engaged condition of the parking lock as well as in a piston position associated with the disengaged condition of the parking lock. Primarily, the mechanical piston interlock is to be better protected against wear caused by pressure fluctuations.

Accordingly, example aspects of the invention are directed to a device for operating a parking lock of a motor vehicle transmission, including an engagement spring provided for engaging the parking lock, an actuator that is hydraulically actuatable in order to disengage the parking lock, an electrohydraulic control unit, and an electronic control unit. The electrohydraulic control unit hydraulically actuates, depending on the situation, gear-forming shift elements of the transmission as well as the actuator, via electromagnetically actuatable hydraulic valves, with pressure that is provided by a pump of the transmission. For this purpose, the electronic control unit electrically actuates the electromagnetically actuatable hydraulic valves in order to specify various shift positions and gears in the transmission. Here, the electrohydraulic control unit generates, by one of the electromagnetically actuatable hydraulic valves, a system pressure predefined by the electronic control unit depending on the situation, which ensures the pressure supply of the gear-forming shift elements and of the actuator that is necessary depending on the situation.

The actuator includes a hydraulic piston, which is operatively connected to the parking lock, is axially displaceably mounted in a housing of the actuator and, together with the housing, forms a pressure chamber, which, upon disengagement of the parking lock, is acted upon by system pressure from the electromagnetically actuatable hydraulic valve generating the system pressure via a pressure line and, upon engagement of the parking lock, is emptied via the pressure line. Additionally, the hydraulic piston of the actuator is mechanically interlockable by an interlocking device, which is actuatable by the electronic control unit, in a piston position associated with the engaged condition of the parking lock as well as in a piston position associated with the disengaged condition of the parking lock.

According to example aspects of the invention, a choke unit, which includes an orifice and a non-return valve, is installed in the pressure line leading to the pressure chamber of the actuator, in the area between the hydraulic valve generating the system pressure and the pressure chamber. The orifice acts in a flow-limiting manner in the feed direction to as well as in the return direction from the pressure chamber of the actuator, and so the flow routed to the pressure chamber of the actuator upon disengagement of the parking lock is limited to a predefined amount, which reduces, in an advantageous way, the installation space of the actuator itself and also the installation space of hydraulic components optionally provided for protecting the actuator. The non-return valve of the choke unit is closed in the feed direction to the pressure chamber of the actuator and is open in the return direction from the pressure chamber, and so a predefined emptying time of the pressure chamber upon engagement of the parking lock is ensured.

In one preferred example embodiment of the choke unit, the orifice and non-return valve are fluidically connected in parallel. This enables a structurally simple, large bandwidth for the individual adaptation of the filling speed as well as of the emptying speed of the actuator pressure chamber to different applications.

In an alternative example embodiment of the choke unit, the orifice and non-return valve are fluidically connected in series, which provides advantages related to installation space as compared to the parallel connection of the orifice and the non-return valve.

The non-return valve of the choke unit can include, as the closing element, for example, a ball, but also a plate, wherein the ball or the plate is then preloaded in the closing direction via a spring counter to the system pressure. Preferably, the through-flow cross-section and the spring characteristics of the non-return valve are structurally dimensioned in such a way that the flow resistance of the non-return valve is as low as possible during the emptying of the actuator compression chamber, i.e., during the engagement of the parking lock.

The inner diameter of the orifice of the choke unit is preferably structurally dimensioned in such a way that due to a flow resistance of the choke, on the one hand, the filling time of the actuator pressure chamber upon disengagement of the parking lock is not adversely affected to an excessive extent also at low operating temperatures and, on the other hand, however, a hydraulic damping effect arises that is sufficiently high for ensuring that the mechanical loading of the actuator piston interlock is mechanically gentle.

Viewed spatially, the choke unit can be an integral part of the electrohydraulic control unit of the transmission, alternatively, however, also an integral part of the actuator.

In order to effectively protect the actuator against damage or destruction by overpressure, it is provided in one example refinement of the invention to additionally fluidically connect a pressure limiting valve to the pressure line leading to the pressure chamber of the actuator in the area—i.e., in the direction of flow—between the choke unit and the pressure chamber. A pressure limiting valve of this type can be designed, for example, structurally simply as a ball or plate valve that is spring-loaded counter to the system pressure prevailing in the pressure line. Viewed spatially, the ball or plate valve is integrated in the electrohydraulic control unit of the transmission or, alternatively, in the actuator. Since the pressure limiting valve is arranged in the direction of flow between the choke unit and the pressure compartment, the flow limitation in the pressure line leading to the actuator pressure chamber generated by the choke unit upon disengagement of the parking lock has a load-reducing effect on the pressure limiting valve, and so the pressure limiting valve can be designed having comparatively small dimensions.

In order to effectively protect the actuator against damage or destruction by overpressure, it is provided in one example refinement of the invention to additionally fluidically connect a pressure limiting valve to the pressure line leading to the pressure chamber of the actuator in the area—i.e., in the direction of flow—between the choke unit and the pressure chamber. Preferably, a hydraulic damper of this type is designed as an integral part of the electrohydraulic control unit of the transmission, although, alternatively, the hydraulic damper can also be an integral part of the actuator.

Structurally, a hydraulic damper of this type is preferably designed as a piston that is axially displaceably arranged in a housing bore vented toward the transmission interior and is spring-loaded counter to the system pressure prevailing in the pressure line leading to the pressure chamber of the actuator. As previously indicated, the housing bore can be arranged in the electrohydraulic control unit of the transmission or in the actuator housing. Alternatively, the hydraulic damper can also be designed as an elastomer element that is deformable under pressure and is placed into a branch of the pressure line leading to the pressure chamber of the actuator that is closed toward the transmission interior. In both cases, the elasticity of the hydraulic damper for damping the amplitudes of dynamic and highly dynamic pressure fluctuations, pressure peaks, and pressure drops arising depending to the situation can be structurally attuned to the particular application, i.e., to the present parking lock system. This concept according to example aspects of the invention advantageously provides a passive damping of the amplitude of dynamic and highly dynamic pressure irregularities—arising depending on the situation—in the pressure feed of a hydraulically actuatable parking lock actuator of any type.

The passive damping of pressure fluctuations—arising depending on the situation—in the pressurization of the actuator piston therefore enables, in a particularly advantageous way, a significant reduction of wear at a mechanical interlock of the actuator piston, in particular while the parking lock is held in the disengaged condition. Disengagement-based component tolerances permit a certain small axial movement of the actuator piston, namely also when the piston interlock is activated, and so pressure fluctuations and pressure peaks of the system pressure acting upon the actuator piston can be transmitted as highly dynamic axial loads from the actuator piston onto the mechanism of the piston interlock, also when the piston interlock is activated. These types of highly dynamic impacts have a wear-promoting effect, as is known. By the pressurization of the actuator piston, which is damped according to example aspects of the invention, such impact-like loads at the piston interlock of the interlocking device can be significantly reduced, which advantageously increases the reliability and service life of the actuator.

In one example embodiment of the invention, it is provided to combine the pressure limiting valve provided as a first example refinement of the invention with the hydraulic damper provided as a second example refinement of the invention. In one preferred example embodiment, the pressure limiting valve is integrated in the hydraulic damper in an installation space-saving manner. The maximum pressure level to be safeguarded by way of the pressure limiting valve is always higher, in this case, with respect to the absolute value thereof, than the pressure fluctuations and pressure peaks to be damped by the hydraulic damper.

A pressure limiting valve integrated in the hydraulic damper can be formed or implemented, for example, by way of an interaction of the spring force of the damper spring, which is already present, with a predefined leading-edge dimension. If the damper piston is now displaced by the leading-edge dimension along the central axis, the existing feed-in port of the hydraulic damper fluidically connects to an appropriately positioned drain hole of the hydraulic damper leading to the interior space of the transmission. For this purpose, the damper spring can have progressive spring characteristics, and so the feed-in port of the hydraulic damper is fluidically connected to the drain hole of the hydraulic damper only above a predefined clutch pressure level. The "soft" portion of the progressive spring characteristics then carries out the desired damping of the high-frequency pressure fluctuations and pressure peaks. Alternatively, the damper spring can also be formed, however, by a mechanical interconnection of two springs—which are preferably mechanically connected in series—having different spring characteristics, wherein the first of these two springs has flat spring characteristics designed for damping the damper piston, whereas the second of these two springs has steep spring characteristics designed for opening the pressure limiting valve.

A pressure limiting valve integrated in the hydraulic damper can also be designed, for example, as a spring-loaded valve, which is integrated in the damper piston in such a way that the existing feed-in port of the hydraulic damper is fluidically connected, above a predefined system pressure level, to a drain hole of the hydraulic damper leading to the interior space of the transmission. This type of pressure limiting valve can be structurally simply designed as a ball valve preloaded counter to the system pressure by a pressure limiting spring or as a plate valve preloaded counter to the system pressure by a pressure limiting spring. The pressure limiting spring can be arranged, in an installation space-saving manner, concentrically within the damper spring, which is always acting upon the damper piston.

BRIEF DESCRIPTION OF THE DRAWINGS

In the following, the invention is explained in greater detail with reference to the drawings, wherein.

DETAILED DESCRIPTION

Figure 1:
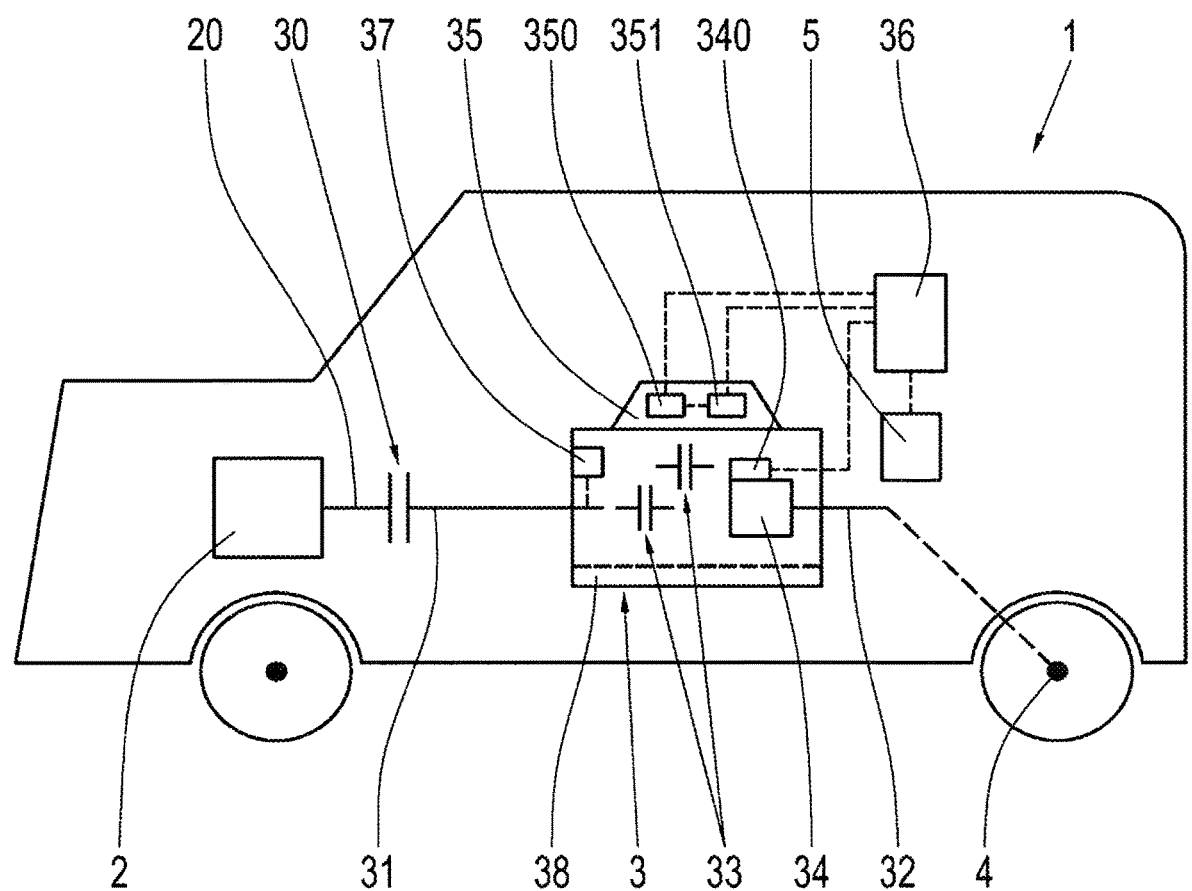
FIG. 1 shows a schematic of a motor vehicle including a transmission having a parking lock.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a schematic of a motor vehicle 1 including an automatic transmission 3, which has multiple gear-forming shift elements 33 and is drivable by a prime mover 2 via a starting component 30. In this way, the drive power of the prime mover 2 is transmittable in preferably multiple different gears or gear steps from an input shaft 31 onto an output shaft 32 of the automatic transmission 3. The output shaft 32 is operatively connected to a drive axle 4 of the motor vehicle 1 via further motor vehicle components merely indicated in FIG. 1.

In addition, the automatic transmission 3 includes a parking lock 34, by which the output shaft 32 and, thereby, also the drive axle 4 of the motor vehicle 1 are fixable. A combination of an electrohydraulic control unit 35 and an electronic control unit 36 is provided for the open-loop control of the automatic transmission 3. The electrohydraulic control unit 35 carries out, on the one hand, the hydraulic actuation of the starting component 30, which is designed as a clutch in this case, by way of example, in order to establish the frictional connection between a crankshaft 20 of the prime mover 2 and the input shaft 31 of the automatic transmission 3. On the other hand, the electrohydraulic control unit 35 carries out the hydraulic actuation of the transmission-internal, gear-forming shift elements 33 in order to implement the gears in the automatic transmission 3 that are appropriate for the situation. In addition, the electrohydraulic control unit 35 also carries out the hydraulic actuation of an actuator 340, which must be supplied with hydraulic fluid in order to disengage the parking lock 34. Multiple electromagnetically actuatable hydraulic valves are provided in the electrohydraulic control unit 35 for actuating the starting component 30, the shift elements 33, and the actuator 340. Of the multiple electromagnetically actuatable hydraulic valves, the hydraulic valves associated with the individual shift elements 33 are labeled with 350, and the hydraulic valve that is provided for generating a system pressure ensuring the pressure supply of the gear-forming shift elements 33 and of the actuator 340 that is necessary depending on the situation is labeled with reference character 351. Accordingly, the electromagnetically actuatable hydraulic valve 351 can also be referred to as a system pressure control valve.

The electronic control unit 36 determines the shift commands necessary depending on the situation as well as open-loop and closed-loop control-related specifications for the electromagnetically actuatable hydraulic valves 350 and 351 and appropriately actuates the electromagnetically actuatable hydraulic valves 350 and 351. The electronic control unit 36 processes, among other things, signals of a selector device 5 arranged in the motor vehicle 1, by which a driver of the motor vehicle 1 can specify individual shift positions for the automatic transmission, in particular the shift positions "Park" (P), "Neutral" (N), "Drive" (D), and "Reverse" (R).

The pressure medium necessary for actuating the starting component 30, the shift elements 33, and the actuator 340 is provided by a pump 37 of the transmission 3. The area of the transmission interior of the transmission 3 that acts as a reservoir for the hydraulic fluid scavenged by the pump 37 and into which excess pressure medium is returned, forms a tank labeled with 38.

In the following and with reference to the schematic in FIG. 2, a first exemplary embodiment of a device according to example aspects of the invention for operating the parking lock 34 shown in FIG. 1 is explained in greater detail.

Figure 2:
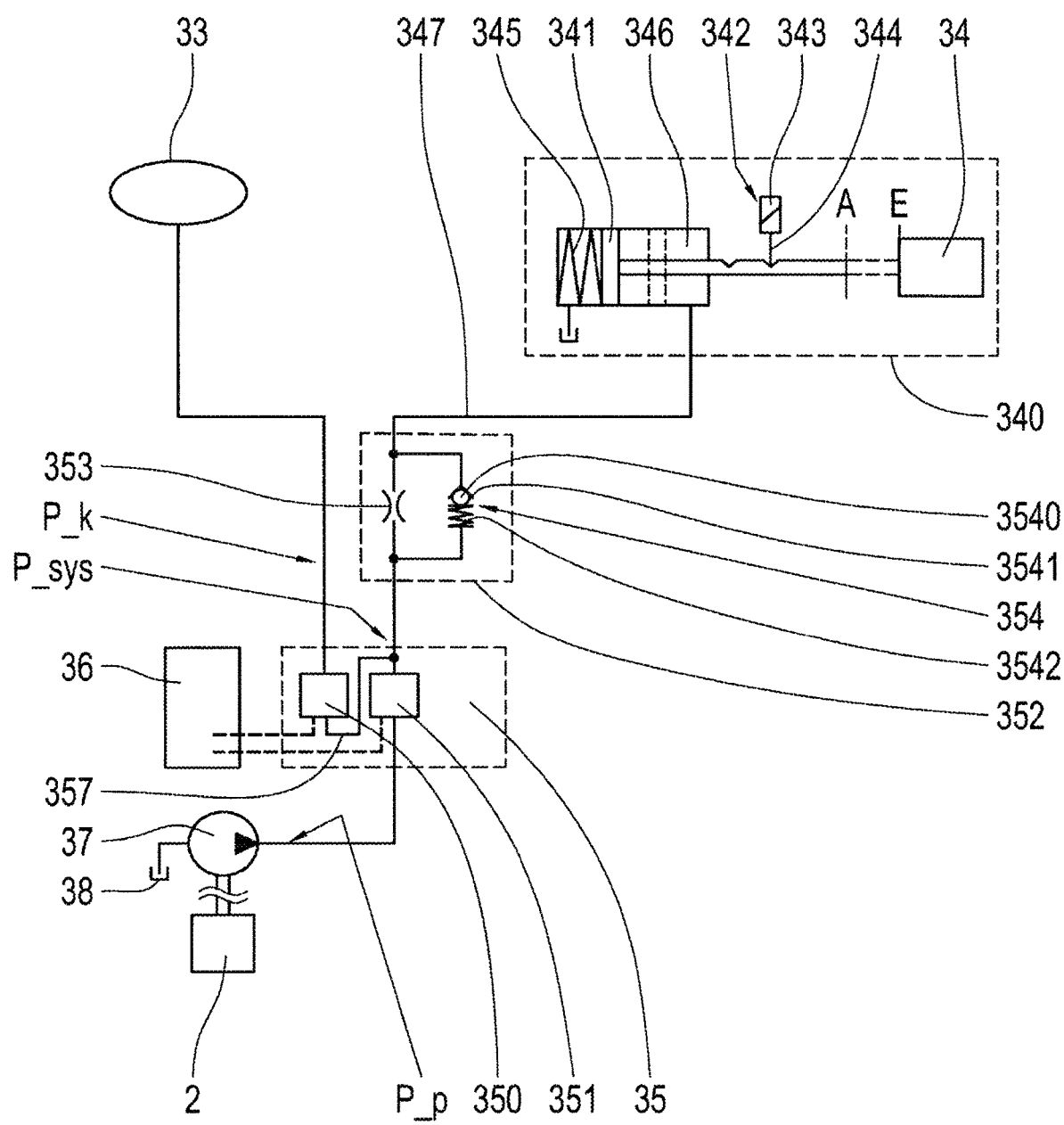
FIG. 2 shows a schematic of a first exemplary embodiment of a device according to the invention for actuating the parking lock according to FIG. 1.

The hydraulic actuator 340 shown in FIG. 2 for actuating the parking lock 34 is known, per se, from the prior art. The actuator 340 includes a hydraulic piston 341, which is operatively connected, in a suitable way, to a blocking element (not represented, for the sake of simplicity) of the parking lock 34 and, in order to disengage the parking lock 34, is acted upon by system pressure P_sys of the hydraulic control unit 35 that is sufficiently high for the pressure supply of the gear-forming shift elements 33 and of the actuator 340 that is necessary depending on the situation. For this purpose, the hydraulic piston 341 forms, together with a housing part of the actuator 340, a pressure chamber 346, which can be filled with hydraulic fluid at system pressure P_sys via a pressure line 347. The actuator 340 is hydraulically actuated by system pressure P_sys via the electromagnetically actuatable system pressure control valve 351, which generates the system pressure P_sys from the pump pressure P_p provided by the transmission-side pump 37 as specified by the electronic control unit 36.

The shift elements 33, however, are hydraulically actuated in order to form gears via electromagnetically actuatable hydraulic valves 350 of the electrohydraulic control unit 35, wherein these hydraulic valves 350 themselves are supplied with system pressure P_sys from the system pressure control valve 351 via a hydraulic line 357 and, from the system pressure P_sys, generate a demand-oriented clutch pressure P_k for the particular gear-forming shift element 33 as specified by the electronic control unit 36. Preferably, a separate hydraulic valve 350 is associated with each shift element 33.

The operative connection between the actuator 340 and the parking lock 34 is designed in such a way that, for the case in which the hydraulic piston 341 is in the engaged position E, the operative connection blocks the parking lock 34 and, for the case in which the hydraulic piston 341 is in the disengaged position A, the operative connection does not block the parking lock 34. If the hydraulic piston 341 is acted upon by pressure, it moves into the disengaged position A, counter to the spring force of an engagement spring 345. Due to the spring force of the engagement spring 345, the hydraulic piston 341 moves in the direction of the engaged position E when the pressurization of the hydraulic piston 341 is switched off, with the result that the parking lock 34 is mechanically engaged. This actuation logic, provided here, for the engagement and disengagement of the parking lock 34 is to be understood as an example. Correspondingly, in an alternative example embodiment of the parking lock, an inverted actuation logic can also be provided, according to which the parking lock is engaged by hydraulic pressure and is disengaged by spring pressure.

Additionally, the actuator 340 includes an interlocking device 342 for mechanically fixing the hydraulic piston 341. The interlocking device 342 includes, by way of example, a pin 344 and an electromagnet 343 provided for actuating the pin 344, wherein, preferably in the non-energized condition of the electromagnet 343, the pin 344 arrests the hydraulic piston 341 either in the engaged position E or in the disengaged position A, i.e., secures the hydraulic piston 341 against an undesired axial displacement.

In order to improve the hydraulic actuation of the pressure chamber 346 of the actuator 340, a choke unit 352 is provided, which is installed in the pressure line 347 in the area between the system pressure control valve 351 (which generates the system pressure P_sys) and the pressure chamber 346 and includes an orifice 353 and a non-return valve 354. The orifice 353 acts in a flow-limiting manner in the feed direction to as well as in the return direction from the pressure chamber 346. The non-return valve 354, however, is closed in the feed direction to the pressure chamber 346 and is open in the return direction from the pressure chamber 346.

In the exemplary embodiment represented in FIG. 2, the orifice 353 and the non-return valve 354 are fluidically connected in parallel, which gives the design engineer a certain amount of freedom when adapting the choke unit 352 to different application-specific requirements in combination with an otherwise identical basic design.

In the exemplary embodiment represented in FIG. 2, the non-return valve 354 is designed, by way of example, as a spring-loaded ball valve including a ball as a closing body 3540, an internally open truncated cone as a closing body seat 3541, and a spring 3542 preloaded counter to the system pressure P_sys for closing the closing body seat 3541 with the closing body 3540. The flow possible through the non-return valve 354 is greater, many times over, than the flow through the orifice 353. While the open inner diameter of the orifice 353 is structurally attuned to the application-specifically desired filling time of the actuator pressure chamber 346 upon disengagement of the parking lock 34, i.e., to the application-specifically desired disengagement speed of the parking lock 34, the open inner diameter of the closing body seat 3541 is attuned to the application-specifically desired emptying time of the actuator pressure chamber 346 upon engagement of the parking lock, i.e., to the application-specifically desired engagement speed of the parking lock 34. A numerical example of a structural design of the choke unit 352 illustrates these relationships: Through-flow diameter one and two-tenths millimeter (1.2 mm) for the orifice 353; through-flow diameter three millimeters (3 mm) and closing pressure one-tenth of a bar (0.1 bar) for the non-return valve 354.

Figure 3:
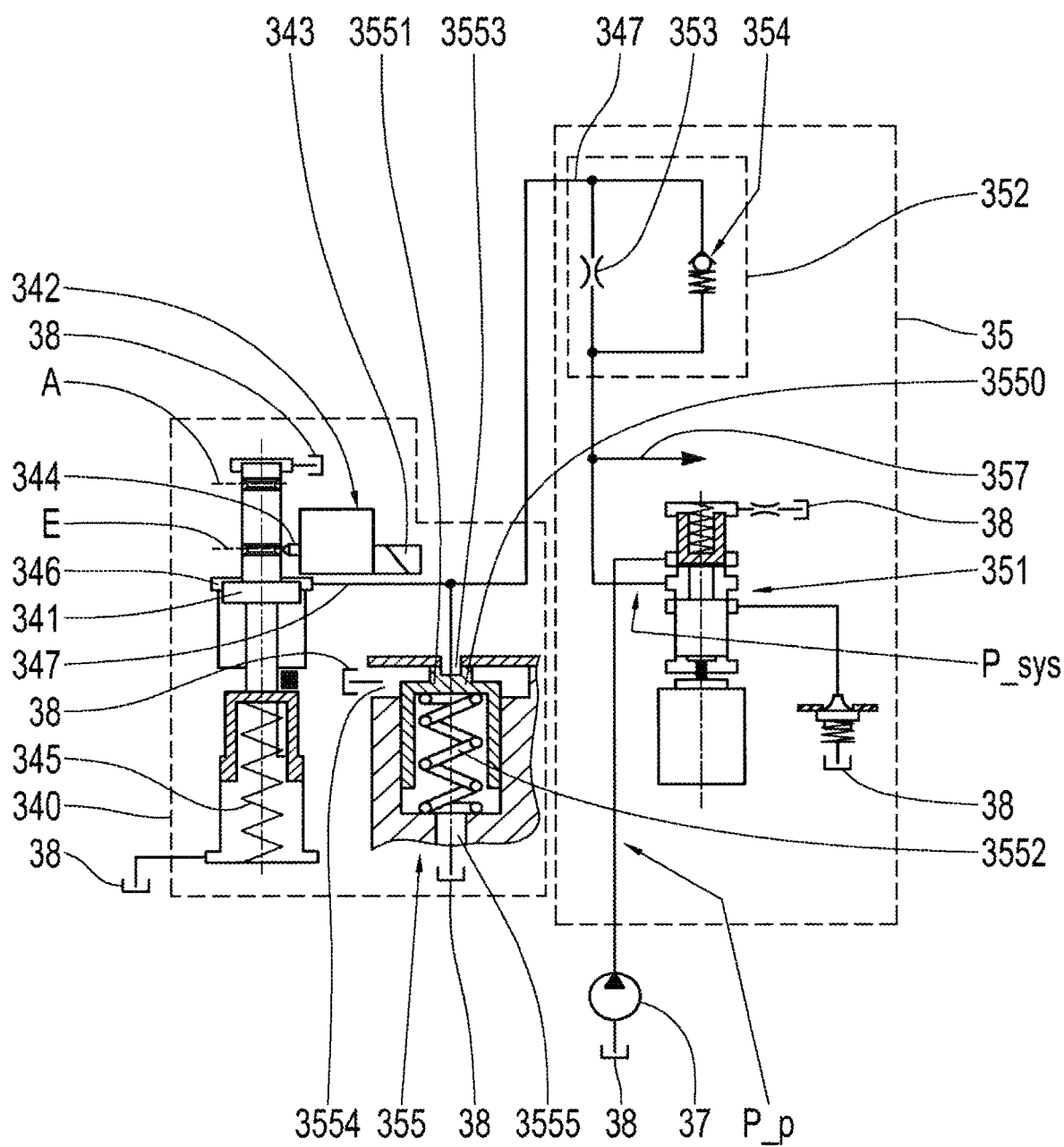
FIG. 3 shows a schematic of a second exemplary embodiment of a device according to the invention for actuating the parking lock according to FIG. 1.

As mentioned above, measures directed against damage to or destruction of the actuator 340 by an excessively high system pressure P_sys can be meaningful. For this purpose, it is provided in the second exemplary embodiment—represented in FIG. 3—of a device according to example aspects of the invention, which is based on the parking lock actuating system shown in FIG. 2, to fluidically connect the pressure line 347 leading to the pressure chamber 346 of the actuator 340 to a pressure limiting valve 355. In the exemplary design represented here, the pressure limiting valve 355 is designed as a plate valve spring-loaded counter to the system pressure P_sys, including a piston-like closing body 3550, a ring-shaped closing body seat 3551, a pressure limiting spring 3552 mounted between the closing body 3550 and a housing section, a cylindrical feed-in port 3553 fluidically connected to the pressure line 347 and situated on the end face of the closing body 3550 on the side opposite the pressure limiting spring 3552, a drain hole 3554 leading to the tank 38 and situated laterally with respect to the closing body 3550, and an air escape 3555 in the spring chamber of the closing body 3550 leading to the tank 38.

In order to be able to utilize the advantages of the choke unit 352 also for the dimensioning of the pressure limiting valve 355, the pressure limiting valve 355 is fluidically connected to a line section of the pressure line 347 leading to the actuator pressure chamber 346, which is located between the choke unit 352 and the pressure chamber 346. Here, the pressure limiting valve 355 in FIG. 3—which is additional as compared to FIG. 2—is an integral part of the actuator 340, by way of example. The choke unit 352 acquired from FIG. 2, however, is an integral part of the electrohydraulic control unit 35. A numerical example of a structural design of the pressure limiting valve 355 illustrates the aforementioned advantage: If the pressure limiting valve 355 is to open at a pressure threshold of twenty-two bar (22 bar), a spring force of approximately twenty-seven and six-tenths newtons (27.6 N) is calculated for the pressure limiting spring 3552 at an effective diameter of the closing body seat 3551 of four millimeters (4 mm); the installation space needed here is also correspondingly small.

As mentioned above, pressure pulsation, temporary pressure peaks, and temporary pressure drops of the system pressure P_sys, by which the hydraulic piston 341 of the actuator 340 can be acted upon, can also result in damage of the actuator 340, in particular in undesired wear at the mechanism of the interlocking device 342 when the interlocking device 342 is in the interlocked position, i.e., in the present example, wear at the pin 344 of the interlocking device 342 and at the piston rod groove, into which the pin 344 engages in position E of the hydraulic piston 341. The obligatory component tolerances permit, namely also in the case of an interlocked pin 344, a certain small axial movement of the hydraulic piston 341, and so highly dynamic axial loads acting upon the hydraulic piston 341, which can be produced by the aforementioned highly dynamic irregularities in the system pressure P_sys, act as highly dynamic impacts upon the piston rod/pin contact point. Disruptive pressure peaks and disruptive pressure drops can arise, for example, during gear ratio changes in the transmission (3).

Figure 4:
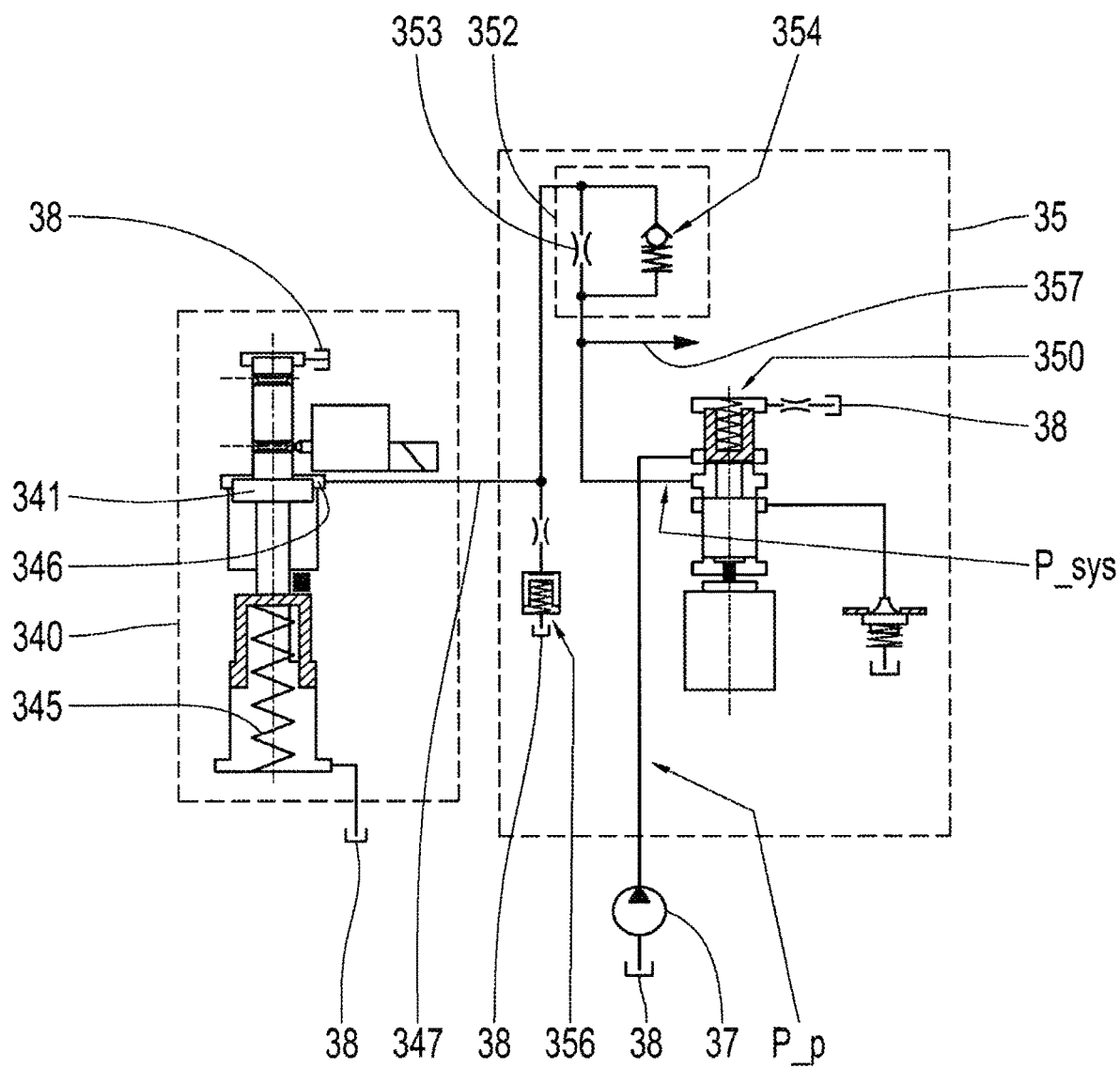
FIG. 4 shows a schematic of a third exemplary embodiment of a device according to the invention for actuating the parking lock according to FIG. 1.

In order to protect the interlocking device 342 against mechanical damage that can be caused by such pressure peaks and pressure drops in the supply pressure of the pressure chamber 346 of the actuator 340, in the third exemplary embodiment of a device according to example aspects of the invention represented in FIG. 4, which is based on the parking lock actuating system shown in FIG. 2, the pressure line 347 leading to the pressure chamber 346 of the actuator 340 is fluidically connected to a hydraulic damper 356. In order to be able to utilize the advantages of the choke unit 352 also for the dimensioning of the hydraulic damper 356, this connection is located at a line section of the pressure line 347 situated between the choke unit 352 and the pressure chamber 346. Here, the choke unit 352 acquired from FIG. 2 and the hydraulic damper 356, which is additional as compared to FIG. 2, are integral parts of the electrohydraulic control unit 35, by way of example, in FIG. 4.

In the exemplary design shown in FIG. 4, the hydraulic damper 356 is designed as a piston/spring damper. Here, the piston of the damper 356 is axially displaceably arranged in a bore of a housing of the electrohydraulic control unit 35 of the transmission (3), wherein the spring of the damper 356 preloads the piston of the damper 356 counter to the system pressure P_sys prevailing in the pressure line 347. Correspondingly, the spring chamber of the damper 356 is vented to the tank 38, which is formed, for example, by an oil pan of the transmission (3). By way of example, an inlet orifice is additionally provided in the fluid flow between the pressure line 347 and the piston chamber of the damper 356.

In FIG. 4, the parking lock (34) (not represented here in greater detail) of the transmission (3) is in the engaged condition. Correspondingly, the hydraulic piston 341 of the parking lock actuator 340 is in the engagement position E and, in the engagement position E, is fixed in the axial direction by the pin 344 of the interlocking device 342 now form-lockingly engaging into a circumferential groove of the piston rod of the hydraulic piston 341.

If the parking lock (34) is disengaged starting from the engaged condition, the pressure chamber 346 of the actuator 340 is acted upon by system pressure P_sys from the electromagnetically actuatable system pressure control valve 351 via the orifice 353 of the choke unit 352 and the pressure line 347, and so, with the pin 344 of the interlocking device 342 released, the hydraulic piston 341 of the actuator 340 moves axially from the piston position E to the piston position A before the pin 344 once again fixes the hydraulic piston 341 in the axial direction. The fluidic connection, which is now provided, of the pressure line 346 leading to the actuator pressure chamber 346 at the hydraulic damper 356 effectively and reliably prevents highly dynamic pressure fluctuations and pressure peaks in the system pressure P_sys from reaching a level that is disruptive to the interlocking device 342. In other words, the hydraulic damper 356 in the pressure feed to the hydraulic piston 341 of the actuator 340 prevents excessive wear at the mechanical interlock of the hydraulic piston 341.

If the parking lock (34) is engaged starting from the disengaged condition, the pressure chamber 346 of the actuator 340 is vented to the tank 38 via the pressure line 347, the non-return valve 354 of the choke unit 352, and the system pressure control valve 351, and so, with the pin 344 of the interlocking device 342 released, the hydraulic piston 341 of the actuator 340 moves axially from the piston position A to the piston position E due to the spring force of the engagement spring 345 of the parking lock (34) before the pin 344 once again fixes the hydraulic position 341 in the axial direction.

In the following and with reference to FIG. 5 through 7, three exemplary designs are explained in greater detail, in which a pressure limiting valve 355 as well as a hydraulic damper 356 are provided for protecting the actuator 340. In these three exemplary designs, the pressure limiting valve 355 is integrated in the hydraulic damper 356 in an installation space-saving manner. Similarly to the third exemplary embodiment of a device according to example aspects of the invention for hydraulically actuating a parking lock actuator shown in FIG. 4, the hydraulic damper 356 in all three of these exemplary designs includes a damper piston 3561, which is preloaded by spring force of a damper spring 3562 counter to the system pressure P_sys provided by the system pressure control valve (351) and is arranged displaceably along the central axis in a bore of a housing 3560 that is vented toward an interior space of the transmission (3). The maximum pressure level to be safeguarded by way of the pressure limiting valve 355 is higher, in any case, with respect to the absolute value thereof, than the pressure fluctuations and pressure peaks to be damped by the hydraulic damper 356.

Figure 6:
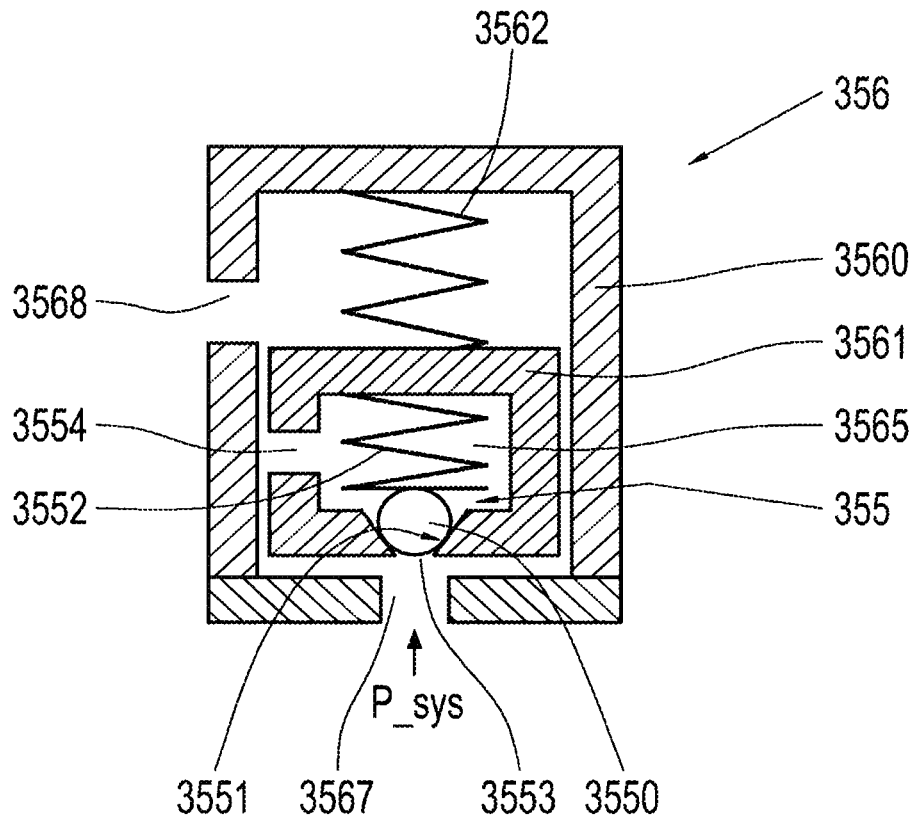
FIG. 6 shows a schematic of a second exemplary design of a damper piston having an integrated pressure limiting piston.
Figure 6:
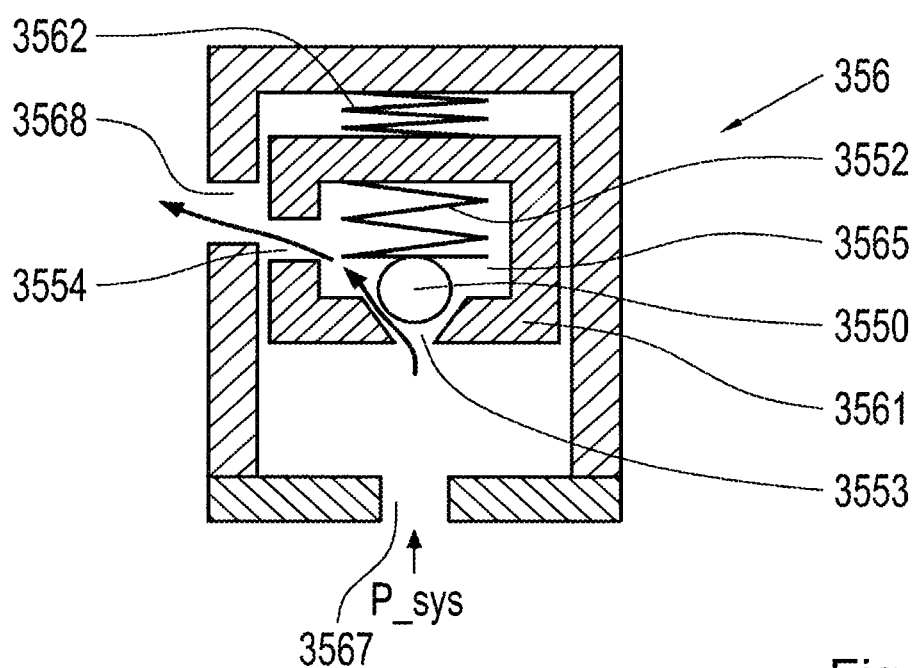

In the first exemplary design represented in FIG. 6, the pressure limiting valve labeled with position number 355 is formed by an interaction of the spring force of the damper spring 3562 with a predefined leading-edge dimension 3569, by which the damper piston 3561 must be displaced along the central axis in order to fluidically connect a feed-in port 3567 of the hydraulic damper 356 supplied with hydraulic fluid under system pressure P_sys to a drain hole 3568 of the hydraulic damper 356 leading to the interior space or to the tank (38) of the transmission (3).

Preferably, multiple lateral drain openings 3568 are provided, since at least three contact surfaces aligned in the shape of a star, i.e., arranged symmetrically distributed at the circumference, are necessary for a well functioning guidance of the damper piston 3561. The intermediate spaces between these contact surfaces can be utilized in a problem-free manner as lateral drain openings 3568.

Figure 5:
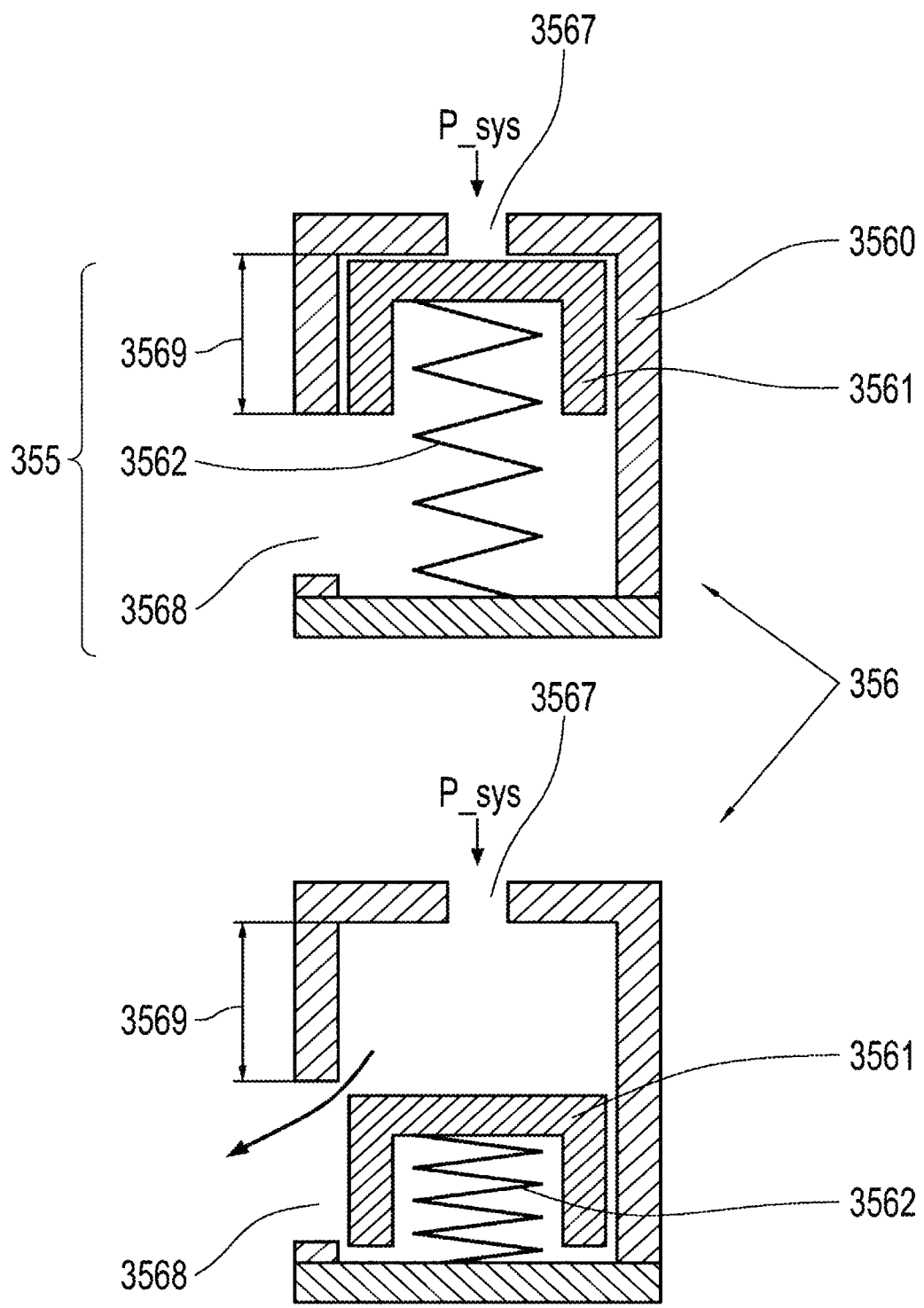
FIG. 5 shows a schematic of a first exemplary design of a damper piston having an integrated pressure limiting piston.

In the upper part of FIG. 5, the damper piston 3561 is in the basic or normal position, in which the system pressure P_sys has no pressure fluctuations and pressure peaks that necessitate a hydraulic damping, and in which the maximum pressure to be safeguarded by the pressure limiting valve 355 has also not yet been reached, by far. In the lower part of FIG. 5, the system pressure P_sys applied at the feed-in port 3567 has exceeded the permissible maximum pressure, and so the damper piston 3561 releases a drainage edge, defined by the leading-edge dimension 3569, of the drain hole 3568 arranged laterally with respect to the damper piston 3561, with the result that hydraulic fluid is now discharged into the transmission interior or into the tank (38) to such an extent that the system pressure P_sys at the feed-in port 3567 is limited to the permissible maximum pressure.

In the exemplary design represented in FIG. 5, the damper spring 3562 has progressive spring characteristics, wherein the "soft" part of these spring characteristics ensures the desired damping function, whereas the switching point of the desired safeguard against overpressure is located in the area of the "hard" part thereof.

Alternatively, a series connection of two springs having different spring characteristics can also be provided, wherein the first spring is then designed as a damper spring having flat spring characteristics designed for damping the damper piston 3561, whereas the second of these two springs then has steep spring characteristics designed for opening the drainage edge of the drain hole 3568 defined by the leading-edge dimension 3569.

In another alternative, two concentrically nested springs having different spring characteristics can also be provided, wherein the first spring is then designed as a damper spring having flat spring characteristics designed for damping the damper piston 3561, whereas the second of these two springs then has steep spring characteristics designed for opening the drainage edge of the drain hole 3568 defined by the leading-edge dimension 3569. In this case, the first spring must have a greater length than the second spring, so that the "hard" second spring does not impede the travel of the "soft" first spring needed for damping. Therefore, it is also useful when the shorter of the two springs, i.e., the "hard" second spring, is attached either at the damper piston 3561 or at the base of the damper housing 3560 facing away from the feed-in port 3567 or, however, at the "soft" first spring. Provided the hydraulic damper 356 designed in such a way is situated in the damping area, only the "soft" damper spring is functioning. Only beyond the damping area does a parallel connection of the spring forces of the two springs arise, as the result of which the damper 356 now operates as a pressure limiting valve 355.

In the second exemplary design represented in FIG. 6, the pressure limiting valve 355 is designed as a ball valve preloaded by a pressure limiting spring 3552, which is integrated in the damper piston 3561 preloaded by spring force of the damper spring 3562 in such a way that the existing feed-in port 3567 of the hydraulic damper 356, via which system pressure P_sys is applicable or applied at the damper piston 3561, is fluidically connected, above a predefined system pressure level, to the drain hole 3568 of the hydraulic damper 356 leading to the interior space or to the tank (38) of the transmission (3). The damper piston 3561 forms a housing element for the pressure limiting valve 355, which is displaceable within a housing 3560 of the hydraulic damper 356. A feed-in port 3553 is provided in the damper piston 3561, which is always fluidically connected to the feed-in port 3567 of the hydraulic damper 356. On a back side, i.e., on the side facing away from the feed-in port 3567, a closing body seat 3551 is formed for the closing body 3550—designed as a ball in this case, by way of example,—of the pressure limiting valve 355, against which the pressure limiting spring 3552 presses the closing body 3550. The spring force of the pressure limiting spring 3552 is selected in such a way that the system pressure P_sys pushes the closing body 3550 out of the closing body seat 3551 once a maximum pressure predefined for the actuator (340) is exceeded and, as a result, enables the inflow of hydraulic fluid from the feed-in port 3567 via the feed-in port 3553 into a hollow chamber 3565 of the damping piston 3561. The closing body 3550 and the pressure limiting spring 3552 of the pressure limiting valve 355 are located within the hollow chamber 3565.

On the side facing away from the feed-in port 3567, i.e., in the spring chamber of the damper spring 3562, the hydraulic damper 356 or the damper housing 3560 is vented via a lateral drain hole 3568 to the transmission interior or to the tank (38). The hollow chamber 3565 of the damper piston 3561 also has a lateral drain hole 3554. The damper piston 3561 itself is axially displaceably arranged, in a known way, in a bore of the housing 3560 of the hydraulic damper 356. Since the pressure limiting spring 3552 is arranged, as viewed spatially, within the hollow chamber 3565 and the damper spring 3562 is arranged, as viewed spatially, above the hollow chamber 3565 of the damper piston 3561, the damper spring 3562 and the pressure limiting spring 3552 are connected in series with respect to force.

In the upper part of FIG. 6, the damper piston 3561 is in the basic position or normal, in which the system pressure P_sys has no pressure fluctuations and pressure peaks that necessitate a hydraulic damping, and in which the maximum pressure to be safeguarded by the pressure limiting valve 355 has also not yet been reached, by far. The spring characteristics of the damper spring 3562 preloading the damper piston 3561 are attuned to the pressure fluctuations and pressure peaks to be damped and are comparatively flat. The spring characteristics of the pressure limiting spring 3552 preloading the closing body 3550, however, are attuned to the maximum pressure to be safeguarded and, therefore, are comparatively steep.

In the lower part of FIG. 6, the system pressure P_sys is at a level that is so high that the damper piston 3561 has compressed the damper spring 3562 to the fully compressed size, with the result that the hollow chamber 3565 of the damper piston 3561 is now fluidically connected via the drain hole 3554 of the hollow chamber 3565 to the drain hole 3568 of the damper housing 3560 and, as a result, is also vented to the transmission interior or to the tank (38). In addition, in the lower part of FIG. 6, the system pressure P_sys applied at the feed-in port 3567 has exceeded the permissible maximum pressure, and so the pressure limiting valve 355 is open, with the result that hydraulic fluid is now discharged into the transmission interior or into the tank (38) to such an extent that the system pressure P_sys at the feed-in port 3567 is limited to the permissible maximum pressure.

Figure 7:
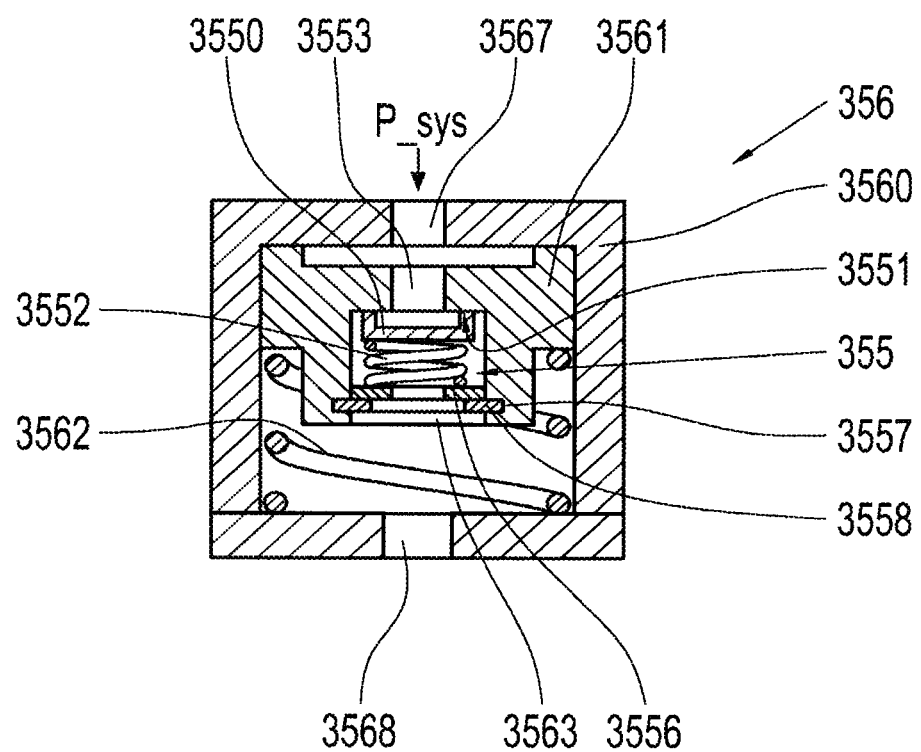
FIG. 7 shows a schematic of a third exemplary design of a damper piston having an integrated pressure limiting piston.
Figure 8:
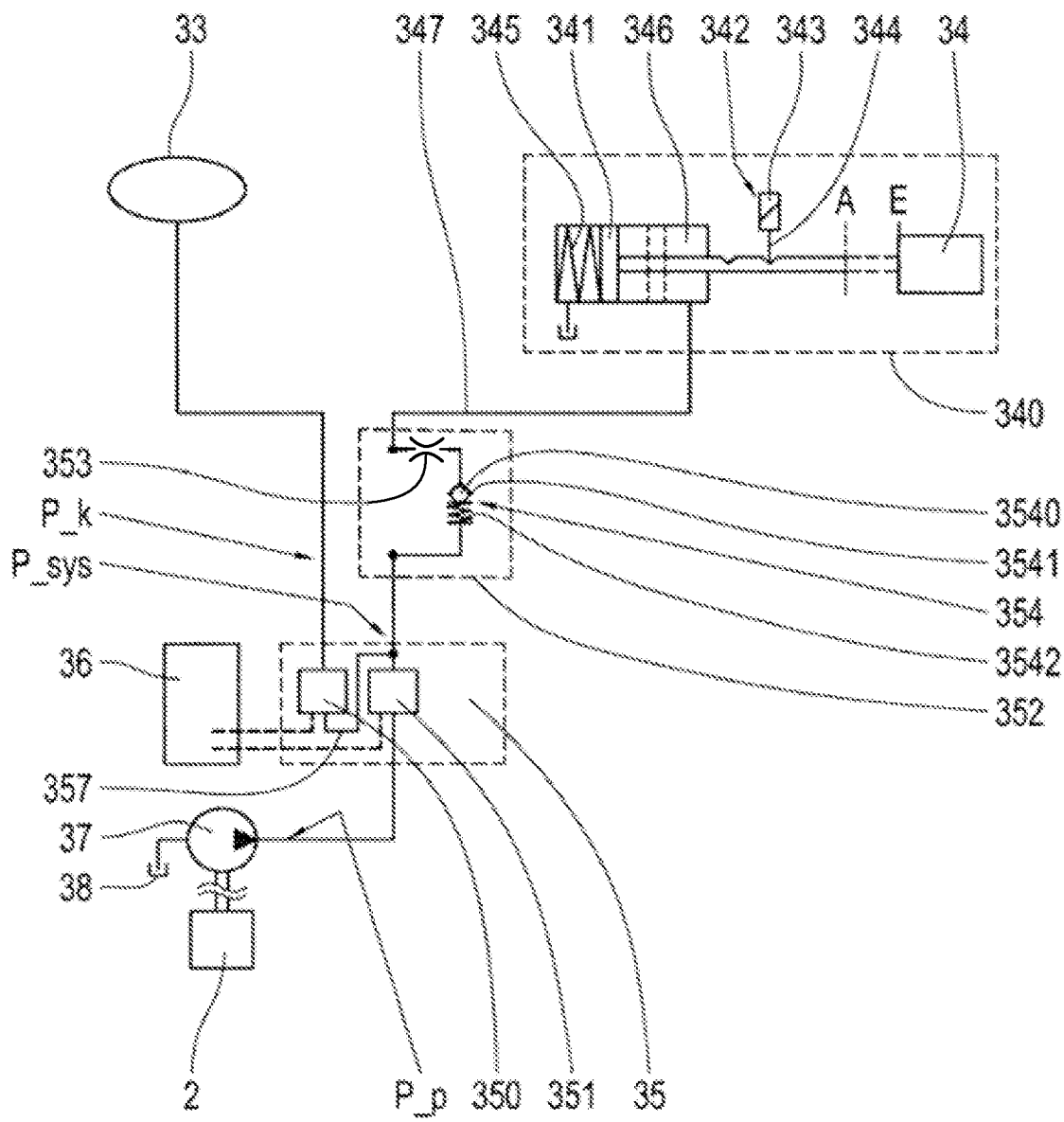
FIG. 8 shows a schematic of another exemplary embodiment of a device according to the invention for actuating the parking lock according to FIG. 1.
Figure 9:
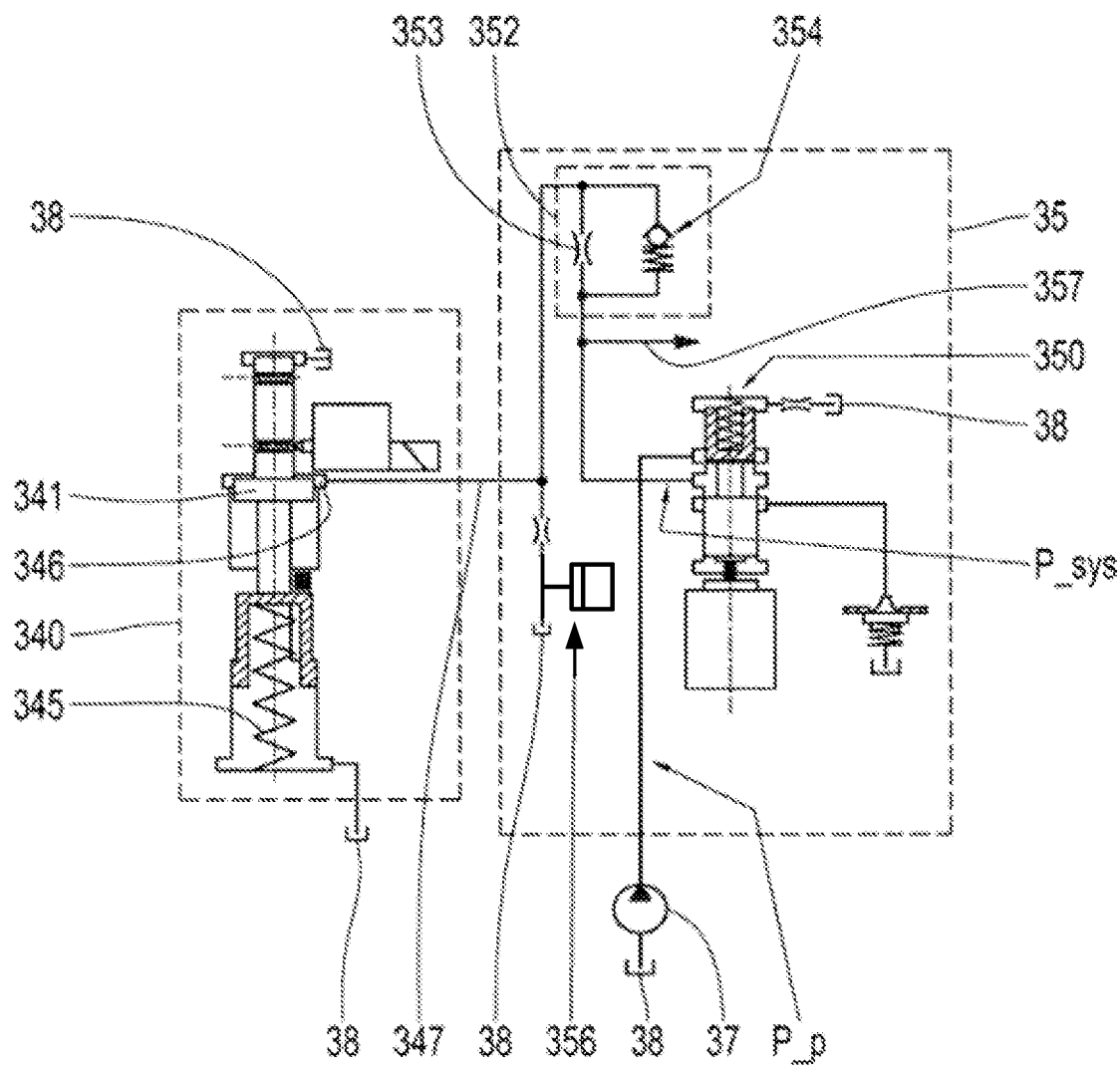
FIG. 9 shows a schematic of another exemplary embodiment of a device according to the invention for actuating the parking lock according to FIG. 1.

The third exemplary design represented in FIG. 7 is a technically simplified and installation space-saving variant of the pressure limiting valve 355 shown in FIG. 6 and is also integrated into the damper piston 3561 of the hydraulic damper 356. The damper piston 3561—similarly to FIG. 6—is axially displaceably arranged in a bore of a housing 3560 of the hydraulic damper 356, wherein system pressure P_sys is applicable or applied at the top-side end face of the damper piston 3561 via a feed-in port 3567 provided in the housing 3560. The system pressure P_sys also acts upon the hydraulic piston (341) (not represented here) of the parking lock actuator (340). On the lower side facing away from the feed-in port 3567, the damper piston 3561 forms a spring chamber for a damper spring 3562, which preloads the damper piston 3561 with respect to the housing 3560. The spring chamber is vented via a drain hole 3568 to the interior space or to the tank (38) of the transmission (3). As in FIG. 6, the spring characteristics of the damper spring 3562 are attuned to the pressure fluctuations and pressure peaks to be damped.

In contrast to FIG. 6, the pressure limiting valve 355 is now designed as a spring-loaded plate valve, which is arranged within a longitudinal bore 3563 of the damper piston 3561. A pressure limiting spring 3552 provided for preloading the pressure limiting valve 355 is also arranged within the longitudinal bore 3563 and presses a closing body 3550—which is now designed as a ring-shaped plate—of the pressure limiting valve 355 against a closing body seat 3551—which is now flat—at the damper piston 3561. The pressure limiting spring 3552 is supported via a disk 3556 at a securing or snap ring 3558, which is placed into an annular groove 3557 of the longitudinal bore 3563, at the damper piston 3561, and so the closing body 3550 is axially mounted between the closing body seat 3551 and the annular groove 3557. Viewed spatially, the pressure limiting spring 3552 is concentrically arranged within the damper spring 3562, at least partially depending on the length of the guidance of the damper piston 3561 in the bore of the housing 3560.

Hydraulic fluid is applied at the closing body 3550 of the pressure limiting valve 355 on the side opposite the pressure limiting spring 3552 via a feed-in port 3553, which is provided in the damper piston 3561 and is constantly fluidically connected to the feed-in port 3567 provided in the housing 3560 of the hydraulic damper 356. The spring characteristics of the pressure limiting spring 3552 are designed in such a way that the pressure limiting valve 355 opens as soon as the system pressure P_sys has exceeded a predefined maximum value. If the pressure limiting valve 355 is open, the longitudinal bore 3563 of the damper piston 3561 simultaneously functions as a drain hole for the excess hydraulic fluid resulting from overpressure, which is then discharged via the drain hole 3568 of the damper housing 3560 to the interior space or to the tank (38) of the transmission (3).

Contrary to the representation in FIG. 7, it can also be provided that the plate-shaped closing body 3550 of the pressure-limiting valve 355 is laterally guided in the longitudinal bore 3563 of the damping piston 3561. In this case, the closing body 3550 needs at least three contact surfaces, which are aligned in the shape of a star, i.e., arranged symmetrically distributed at the circumference. The intermediate spaces between these contact surfaces then function as lateral overflow ducts for the fluid transport from the feed-in port 3553 via the longitudinal bore 3563 to the drain hole 3568 when the pressure limiting valve 355 is open.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS

1 motor vehicle
2 prime mover of the motor vehicle
20 crankshaft of the prime mover
3 transmission of the motor vehicle
30 starting component between the prime mover and the transmission
31 input shaft of the transmission 32 output shaft of the transmission
33 shift elements of the transmission
34 parking lock of the transmission
340 actuator of the parking lock
341 hydraulic piston of the actuator
342 interlocking device
343 electronic component of the interlocking device
344 pin of the interlocking device
345 engagement spring of the parking lock
346 pressure chamber of the actuator
347 pressure line to the pressure chamber
35 electrohydraulic control unit of the transmission
350 electromagnetically actuatable hydraulic valve of the electrohydraulic control unit for actuating a shift element
351 electromagnetically actuatable hydraulic valve of the electrohydraulic control unit for generating the system pressure
352 choke unit
353 orifice of the choke unit
354 non-return valve of the choke unit
3540 closing body of the non-return valve
3541 closing body seat of the non-return valve
3542 spring of the non-return valve
355 pressure limiting valve
3550 closing body of the pressure limiting valve
3551 closing body seat of the pressure limiting valve
3552 pressure limiting spring
3553 feed-in port of the pressure limiting valve
3554 drain hole of the pressure limiting valve
3555 air escape of the pressure limiting valve
3556 disk
3557 annular groove
3558 securing ring
356 hydraulic damper
3560 housing of the damper
3561 damper piston
3562 damper spring
3563 longitudinal bore in the damper piston
3564 hollow chamber in the damper piston
3566 drain hole of the hollow chamber
3567 feed-in port of the damper
3568 drain hole of the damper
3569 leading-edge dimension
357 hydraulic line
36 electronic control unit of the transmission
37 pump of the transmission
38 tank; oil sump
4 drive axle of the motor vehicle
5 operating unit for the transmission
A position of the hydraulic piston in the disengaged condition of the parking lock
E position of the hydraulic piston in the engaged condition of the parking lock
P_k clutch pressure
P_p pump pressure
P_sys system pressure

The invention claimed is:

1. A device for operating a parking lock (34) of a transmission (3) in a motor vehicle (1), comprising:
an engagement spring (345) configured for engaging the parking lock (34);
an actuator (340) hydraulically actuatable to disengage the parking lock (34), the actuator (340) comprising a hydraulic piston (341) operatively connected to the parking lock (34) and axially displaceably mounted in a housing of the actuator (340), the hydraulic piston (341) and the housing forming a pressure chamber (346);
an electrohydraulic control unit (35) configured to hydraulically actuate gear-forming shift elements (33) of the transmission (3) as well as the actuator (340) with pressure provided by a pump (37) of the transmission (3);
an electronic control unit (36) configured to electrically actuate electromagnetically actuatable hydraulic valves (350, 351) of the electrohydraulic control unit (35) in order to implement shift positions (P, R, N, D) and gears in the transmission (3), the electrohydraulic control unit (35) is configured to generate, by one of the electromagnetically actuatable hydraulic valves (351), a system pressure (P_sys) predefined by the electronic control unit (36) to provide a pressure supply for the gear-forming shift elements (33) and of the actuator (340), the pressure chamber (346) of the actuator (340) acted upon by the system pressure (P_sys) via a pressure line (347) when the parking lock (34) is disengaged and emptied via the pressure line (347) when the parking lock (34) is engaged;
an interlocking device (342) operable to mechanically interlock the hydraulic piston (341), the interlocking device (342) actuatable by the electronic control unit (36) in a piston position (E) associated with an engaged condition of the parking lock (34) as well as in a piston position (A) associated with a disengaged condition of the parking lock (34);
a choke unit (352) comprising an orifice (353) and a non-return valve (354), the choke unit (352) installed in the pressure line (347) between the one of the electromagnetically actuatable hydraulic valves (351) that generates the system pressure (P_sys) and the pressure chamber (346);
a hydraulic damper (356) fluidically connected to the pressure line (347) between the choke unit (356) and the pressure chamber (346); and
a pressure limiting valve (355) fluidically connected to the pressure line (347) between the choke unit (352) and the pressure chamber (346), wherein the pressure limiting valve (355) is integrated in the hydraulic damper (356),
wherein the orifice (353) is configured to limit flow in a feed direction to the pressure chamber (346) as well as in a return direction from the pressure chamber (346), and
wherein the non-return valve (354) is configured to close in the feed direction to the pressure chamber (346) and to open in the return direction from the pressure chamber (346).

2. The device of claim 1, wherein the orifice (353) and the non-return valve (354) are fluidically connected in parallel.

3. The device of claim 1, wherein the orifice (353) and the non-return valve (354) are fluidically connected in series.

4. The device of claim 1, further comprising a pressure limiting valve (355) fluidically connected to the pressure line (347) between the choke unit (352) and the pressure chamber (346).

5. The device of claim 4, wherein the orifice (353) and the non-return valve (354) are integrated in the electrohydraulic control unit (35) of the transmission (3), and the pressure limiting valve (355) is integrated in the actuator (340).

6. The device of claim 4, wherein the orifice (353) and the non-return valve (354) are integrated in the electrohydraulic control unit (35) of the transmission (3), and the pressure limiting valve (355) and the hydraulic damper (356) are integrated in the actuator (340).

7. The device of claim 1, wherein the hydraulic damper (356) comprises an elastomer element deformable under pressure and disposed in a branch of the pressure line (347) that connects to an interior space of the transmission (3).

8. The device of claim 1, wherein the hydraulic damper (356) comprises a damper piston (3561) preloaded by spring force of a damper spring (3562) counter to the system pressure (P), the damper piston (3561) displaceably arranged in a bore of a housing (3560) of the hydraulic damper (346) that is vented toward an interior space of the transmission (3).

9. The device of claim 1, wherein the pressure limiting valve (355) is formed by an interaction of the spring force of the damper spring (3562) with a predefined leading-edge dimension (3569) by which the damper piston (3561) is displaced in order to fluidically connect a feed-in port (3567) of the hydraulic damper (356) to a drain hole (3568) of the hydraulic damper (356) leading to the interior space of the transmission (3).

10. The device of claim 9, wherein the damper spring (3562) has progressive spring characteristics such that the feed-in port (3567) of the hydraulic damper (356) is fluidically connected to the feed-in port (3568) of the hydraulic damper (356) only above a predefined system pressure level.

11. The device of claim 9, wherein:
the damper spring (3562) is formed by a mechanical interconnection of two springs having different spring characteristics;
a first one of the two springs having a flatter spring characteristic designed for damping the damper piston (3561), and
a second one of the two springs has a steeper spring characteristic designed for opening the pressure limiting valve (355).

12. The device of claim 11, wherein the two springs are mechanically connected in series.

13. The device of claim 1, wherein the pressure limiting valve (355) comprises a valve preloaded by a pressure limiting spring (3552) and integrated in the damper piston (3561) such that a feed-in port (3567) of the hydraulic damper (356) is fluidically connected to a drain hole (3568) of the hydraulic damper (356) leading to the interior space of the transmission (3) above a predefined system pressure level.

14. The device of claim 13, wherein the pressure limiting spring (3552) is concentrically arranged within the damper spring (3562).

15. The device of claim 1, wherein the choke unit (352) is integrated in the electrohydraulic control unit (35) of the transmission (3).

16. The device of claim 1, wherein the choke unit (352) is integrated in the actuator (340).

17. A device for operating a parking lock (34) of a transmission (3) in a motor vehicle (1), comprising:
an engagement spring (345) configured for engaging the parking lock (34);
an actuator (340) hydraulically actuatable to disengage the parking lock (34), the actuator (340) comprising a hydraulic piston (341) operatively connected to the parking lock (34) and axially displaceably mounted in a housing of the actuator (340), the hydraulic piston (341) and the housing forming a pressure chamber (346);
an electrohydraulic control unit (35) configured to hydraulically actuate gear-forming shift elements (33) of the transmission (3) as well as the actuator (340) with pressure provided by a pump (37) of the transmission (3);
an electronic control unit (36) configured to electrically actuate electromagnetically actuatable hydraulic valves (350, 351) of the electrohydraulic control unit (35) in order to implement shift positions (P, R, N, D) and gears in the transmission (3), the electrohydraulic control unit (35) is configured to generate, by one of the electromagnetically actuatable hydraulic valves (351), a system pressure (P_sys) predefined by the electronic control unit (36) to provide a pressure supply for the gear-forming shift elements (33) and of the actuator (340), the pressure chamber (346) of the actuator (340) acted upon by the system pressure (P_sys) via a pressure line (347) when the parking lock (34) is disengaged and emptied via the pressure line (347) when the parking lock (34) is engaged;
an interlocking device (342) operable to mechanically interlock the hydraulic piston (341), the interlocking device (342) actuatable by the electronic control unit (36) in a piston position (E) associated with an engaged condition of the parking lock (34) as well as in a piston position (A) associated with a disengaged condition of the parking lock (34);
a choke unit (352) comprising an orifice (353) and a non-return valve (354), the choke unit (352) installed in the pressure line (347) between the one of the electromagnetically actuatable hydraulic valves (351) that generates the system pressure (P_sys) and the pressure chamber (346);
a pressure limiting valve (355) fluidically connected to the pressure line (347) between the choke unit (352) and the pressure chamber (346); and
a hydraulic damper (356) fluidically connected to the pressure line (347) between the choke unit (353) and the pressure chamber (346), wherein the orifice (353), the non-return valve (354), and the hydraulic damper (356) are integrated in the electrohydraulic control unit (35) of the transmission (3), and the pressure limiting valve (355) is integrated in the actuator (340),
wherein the orifice (353) is configured to limit flow in a feed direction to the pressure chamber (346) as well as in a return direction from the pressure chamber (346), and
wherein the non-return valve (354) is configured to close in the feed direction to the pressure chamber (346) and to open in the return direction from the pressure chamber (346).

* * * * *